United States Patent Office.

JAMES M. CRAFTS, OF BOSTON, MASSACHUSETTS.

Letters Patent No. 80,459, dated July 28, 1868.

---

IMPROVEMENT IN AGEING AND PURIFYING SPIRITS.

---

The Schedule referred to in these Letters Patent and making part of the same.

---

TO ALL PERSONS TO WHOM THESE PRESENTS MAY COME:

Be it known that I, JAMES M. CRAFTS, of Boston, in the county of Suffolk, and State of Massachusetts, have made a new and useful invention, having reference to the Improvement of Distilled Alcoholic Liquors, such as whiskey, brandy, rum, &c.; and I do hereby declare the same to be fully described, as follows:

By my process, I produce, in a very short period of time, effects or changes, which such liquor undergoes when allowed to stand in the usual way, for a much greater length of time, in barrels or casks. In other words, I attain the ozonizing of the liquor, and the absorption and solution by it of certain coloring or other matters which tend to or do materially improve it for the palate or other purposes.

The effect of air on distilled liquors being due to the action of ozone or antozone, which is usually present in small quantities in the air, and it being well known that this chemical principle may be developed by the passage of electricity through air or by other well-known means, as, for instance, the passing of air or oxygen through a space included between parallel surfaces of glass, between which a current of electricity is caused to pass, I employ for my purpose any convenient and proper method of producing the ozone, or of obtaining air impregnated therewith, and in carrying out my invention, I force such air, so impregnated with ozone, through the distilled whiskey or liquor, or I agitate the liquor and a quantity of such ozonized air together, or cause the liquor to be passed through the air in drops or fine streams, or I cause the ozonized air to pass in numerous currents through the liquor, until, by such exposure of the liquor, I produce the effect, which is the consequence of the action of the atmosphere on such liquor when the latter is allowed to stand for a very much longer time in a vessel.

In further carrying out my invention, I introduce into the distilled liquor, so treated, or to be treated, shavings or small masses of oak or any other wood, or charred wood, the same being in order to obtain results identical with those obtained by allowing the distilled liquor to stand for a great length of time in barrels, whether charred or not, and extract therefrom the coloring or other matters contained in the wood thereof.

And, in further carrying out my invention, I employ heat, that is, I heat the liquor in a closed or close vessel, so as to prevent evaporation of such liquor. I have found that when whiskey is so heated in a close vessel, and kept therein heated for a short period, at a temperature near that of boiling water, the action of the various bodies or matters contained in the distilled liquor upon each other is greatly accelerated, an improvement in the quality of the liquor being also effected.

By so heating the liquor, preparatory to or after being ozonized, or by keeping it heated while containing wood shavings or other material, from which coloring or other matter is to be extracted, the liquor will be greatly improved, and the extraction of the coloring or other matter will be facilitated.

Although the several modes above described may be used together in the improvement of a distilled liquor, they may be separately employed. I find a few hours generally sufficient for producing the ozoning and coloring of the liquor. In other words, I can produce in that time such a conversion of the whiskey as has heretofore been attained by allowing it to stand for years in a barrel. My invention, therefore, effects a saving in labor, storage, interest, insurance, and loss by evaporation, and enables new whiskey or liquor, in a very short period of time, to be greatly improved, or to have all the qualities which it usually gains by age or by standing for a long time in pipes or casks.

I am aware that for making decoctions or vegetable extracts, it is customary to employ heat, and therefore I make no claim to such employment of it, but I use it in connection with the means of preventing evaporation of the liquor, also with such and the material from which the extract or extracts are to be obtained, and this either previous to or after the treatment of the liquor by subjecting it to the action of air charged with ozone or antozone.

I would remark that instead of using air as the vehicle for transferring the ozone or antozone into the liquor, I can employ a gas, as oxygen, for instance, such being first charged with ozone.

Various processes have been heretofore adopted for improving or ageing distilled liquors, the natural ageing of them having been attributed to the action of three agents, viz, motion, heat, and atmospheric air, or the oxygen contained in the air, and consequently the result has been sought to be obtained by artificial means of bringing the said agents into operation on an alcoholic liquor.

An arrangement of swinging shelves, for the purpose of agitating the liquor while exposed for a certain length of time to a temperature of 80° to 100° Fahrenheit, has been employed.

The liquor has been pumped up from a tank, and thence allowed to fall through a series of strainers back into the tank, and there been subjected to the action of heat, and a current of electricity passed through the liquor.

The alcoholic liquor has also been allowed to trickle or pass through masses of yarn so as to expose it to the action of air. Air has also been forced through the spirituous liquor contained in vessels. Air has also been forced into a vessel containing the spirituous liquor, and agitated with the liquor. At the same time an electric current has been passed through the liquid.

All such efforts, however, were, at the most, but approximates to my invention, as, although they might produce the result of ageing the liquor, the time of accomplishing it was very great in comparison to that required by my invention. I have ascertained that ozone or antozone is the active agent, and I employ air or oxygen only as a vehicle for carrying the ozone or antozone through or into the liquor.

When a current of electricity is caused to flow through a mass of alcoholic liquor in agitation, or having air passed through it, the property of the liquid of conducting the electricity being so much superior to that of air, it will be seen that the electricity will be confined to the liquid, and will exert little or no action on the air to ozonize or produce ozone. Consequently the action of the air on the liquid will, for all practical purposes, be no different when electricity is being transmitted through the liquid, from what it will be without such. The action of the current of electricity on the liquid must be simply to decompose a very small portion of it. The oxygen eliminated from so small a portion of the liquid decomposed, even if it could be ozonized by the electric current, would be of so trifling an amount as to be of no practical value in producing the effect of ageing the liquor.

Thus it will be seen that the active agent employed by me to produce the desired effect has not to any appreciable or practical extent been before used. In fact I am not aware that before my discovery of the action of ozone on a spirituous liquor there has been any knowledge of such action.

I have, therefore, not only made an important discovery, but I have invented or discovered an application of it of great practical value in the arts.

One difference, therefore, between my invention and others, as above mentioned, for ageing and otherwise treating liquors, as hereinbefore mentioned, is, that I employ ozone or air charged therewith, to produce the result; and furthermore, I employ electricity, not to go through the liquid with air, but to ozonize the air before it is forced into or through, or brought into contact with the liquid or spirituous liquor to be treated. By my process I thus charge the air with ozone, and force or bring it so charged into the liquid, or in contact with its particles, and thus I produce, in a far more rapid manner, and with highly economic results, comparatively the desired effects, or the ageing of the liquor.

I claim, therefore, as my invention, the following; that is to say—

I claim the forcing of whiskey or a distilled liquor through air, or a gas charged with ozone or antozone, or the forcing of air or gas charged with ozone or antozone through whiskey or a distilled liquor, or the agitating together of whiskey or other distilled liquor, and air or gas charged with ozone or antozone.

I also claim, in connection therewith, the employment, as explained, of oak shavings, or other coloring equivalent or material, from which an extract is to be obtained.

I also claim the treating of air by electricity, so as to ozonize such air, and subsequently passing such air in contact with or through whiskey or an alcoholic liquor, the same being as and for the purpose or purposes substantially as specified.

I also claim, for the improvement of the liquor, confining it in a close vessel, and subjecting it while therein to the action of the heat; and I also claim the combination of the same, and the application of ozone or antozone to the liquor, by means substantially as specified.

JAMES M. CRAFTS.

Witnesses:
R. H. EDDY,
SAMUEL N. PIPER.